(12) United States Patent
Zoccola, Jr.

(10) Patent No.: US 6,507,793 B1
(45) Date of Patent: Jan. 14, 2003

(54) METHOD FOR MEASURING VORTICITY

(75) Inventor: Paul J. Zoccola, Jr., Gaithersburg, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/832,158

(22) Filed: Apr. 9, 2001

(51) Int. Cl.[7] .............................................. G06F 17/00
(52) U.S. Cl. .............................. 702/50; 702/55; 702/47
(58) Field of Search .............................. 702/50, 55, 47; 73/204.23, 862.59, 861.22, 170; 134/1

(56) References Cited

U.S. PATENT DOCUMENTS

| | | | | |
|---|---|---|---|---|
| 4,345,482 A | * | 8/1982 | Adolfsson ................. | 73/862.59 |
| 5,477,734 A | * | 12/1995 | Zemel et al. ............. | 73/204.23 |
| 5,600,060 A | * | 2/1997 | Grant ........................... | 73/147 |
| 6,424,923 B1 | * | 7/2002 | Huyer et al. ................. | 702/45 |

* cited by examiner

Primary Examiner—Bryan Bui
Assistant Examiner—Tung S Lau
(74) Attorney, Agent, or Firm—Howard Kaiser

(57) ABSTRACT

As distinguished from conventional fluid flow vorticity determination methodologies, which must simultaneously measure all velocity components at plural locations, vorticity determination is inventively effected whereby velocity components are non-simultaneously (sequentially) measured at the various locations. At least three locations in the fluid are selected, a velocity signal is generated at each location, a reference signal (such as relating to pressure, acceleration or force) is generated at each location simultaneously with the generation of the velocity signal at such location, the time intervals between reference signals are recognized, and the foregoing information is received and/or considered by a computer system which mathematically accomplishes simultaneity of the generation of the velocity signals, thereby computing the vorticity as if such simultaneity has actually occurred. Since real simultaneity of velocity measurements is not required, less complicated and more economical velocity measurement apparatus (such as velocity probes) can be implemented.

32 Claims, 5 Drawing Sheets

METHOD FOR MEASURING VORTICITY

CROSS-REFERENCE TO RELATED APPLICATION

This patent application is related to the nonprovisional U.S. patent application being filed concurrently herewith, hereby incorporated herein by reference, entitled "X-Wire Probe for Velocity Measurements Near the Downstream Edge of an Aperture," sole inventor Paul J. Zoccola, Jr., application Ser. No. 09/832,155, filing date Apr. 9, 2001.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to methods and apparatuses for measuring fluid flow, more particularly for measuring vorticity.

Vorticity is a property of fluid flow that may be calculated from the velocity field by the equation $$\vec{\Omega} = \nabla \times \vec{u}, \quad (1)$$

where $\vec{\Omega}$ is the vorticity vector at a location, and $\vec{u}$ is the velocity vector at that location. If the flow is assumed to be two-dimensional, equation (1) may be reduced to $$\Omega_3 = dv/dx - du/dy, \quad (2)$$

where $\Omega_3$ is the vorticity component in the z direction, and u and v are the velocity components in the x and y directions, respectively. When velocities are available at discreet locations in space, rather than continuously, equation (2) becomes $$\Omega_3 = \Delta v/\Delta x - \Delta u/\Delta y. \quad (3)$$

Because vorticity is made up of spatial derivatives of velocity, measurement of vorticity requires measurements of velocity at more than one location. Generally, these measurements must be made simultaneously. Among the many applications of hot-wire probes are those involving measurement of vorticity, which requires measurements of velocity at more than one location. Hot-wire probes have been used to simultaneously measure the velocity vector at several locations; however, the hot-wire probes known for measuring vorticity typically require at least six wires, and thus are rather complex.

It is therefore desirable to be capable of measuring vorticity at different locations wherein such measurements need not be made simultaneously.

SUMMARY OF THE INVENTION

In view of the foregoing, it is an object of the present invention to provide method and apparatus for measuring vorticity using non-simultaneous velocity measurements at different locations (i.e., velocity measurements which occur non-simultaneously from location to location).

In accordance with many embodiments of the present invention, a method for measuring vorticity relating to the flow of a fluid comprises: sensing the velocity of the fluid at each of at least three locations in the fluid; sensing a reference property of the fluid at each of the three locations; identifying a temporal relationship among the at least three locations in terms of when the sensing of a reference property occurs; and mathematically rendering contemporaneousness of the sensing of the velocity at the at least three locations.

Further according to many embodiments of the present invention, a computer program product comprises a computer useable medium having computer program logic recorded thereon for enabling a computer to determine the vorticity pertaining to the flow of a fluid. The computer program logic comprises: means for enabling the computer to define at least three locations in the fluid; means for enabling the computer to receive information pertaining to the sensing of the velocity of the fluid at each of the at least three locations; means for enabling the computer to receive information pertaining to the sensing of a reference property of the fluid at each of the at least three locations; means for enabling the computer to identify a time relationship among the at least three locations in terms of when the sensing of a reference property occurs; and means for enabling the computer to mathematically render contemporaneousness of the sensing of the velocity at the at least three locations.

Also according to the present invention, a system for determining the vorticity pertaining to the flow of a fluid comprises a machine having a memory. The machine contains a data representation of the vorticity pertaining to the flow of the fluid. The data representation is generated, for availability for containment by said machine, by the method comprising: defining at least three locations in the fluid; receiving information pertaining to the sensing of the velocity of the fluid at each of the at least three locations; receiving information pertaining to the sensing of a reference property of the fluid at each of the at least three locations; identifying a time relationship among the at least three locations in terms of when the sensing of a reference property occurs; and mathematically rendering contemporaneousness of the sensing of the velocity at the at least three locations.

The present invention provides a methodology for measuring vorticity using velocity measurements taken at least two different locations. This invention is particularly efficacious when measuring vorticity using velocity measurements which are effectuated non-simultaneously at least two different locations. Conventionally, vorticity of a fluid is determinable only if all of the velocity measurements are effectuated simultaneously. Thus, a primary advantage of this invention is that it allows vorticity to be measured using non-simultaneous velocity data. This is a significant advantage because it allows simpler and/or less costly measurement systems than are required for simultaneous measurements of velocity.

The above-noted concurrently filed application entitled "X-Wire Probe for Velocity Measurements Near the Downstream Edge of an Aperture" discloses an inventive x-wire probe device for effecting velocity measurements. The x-wire probe according to that invention lends itself to efficacious use in association with the fluid vorticity measurement methodology according to this invention. An advantage of using the inventive x-wire probe disclosed in the concurrently filed application derives from the relative simplicity of such inventive x-wire probe as compared with the more complex hot-wire probes which have been known for measuring vorticity. Nevertheless, it is emphasized that the inventive vorticity measurement method disclosed herein admits of application under a variety of fluidic contexts and circumstances as well as through implementation of a variety of probe types.

Other objects, advantages and features of this invention will become apparent from the following detailed description of the invention when considered in conjunction with the accompanying drawings.

Hereby incorporated herein by reference is the following 180-page U.S. Navy technical report which discloses various aspects of the present invention: Paul J. Zoccola, Jr., "Experimental Investigation of Flow-Induced Cavity Resonance," NSWCCD-TR-2000/010, June 2000, Signatures Directorate Technical Report, Naval Surface Warfare Center, Carderock Division, West Bethesda, Md., 20817-5700. The substance of this report is also available under reference number 9969545 from Bell and Howell Company, Skokie, Ill. in the form of the inventor's doctoral dissertation. This dissertation is also expected to be available from the library of the Catholic University of America, Washington, D.C.

BRIEF DESCRIPTION OF THE DRAWINGS

In order that the present invention may be clearly understood, it will now be described, by way of example, with reference to the accompanying drawings, wherein like numbers indicate the same or similar components, and wherein.

DETAILED DESCRIPTION OF THE INVENTION

In accordance with the present invention, the non-stationary component of vorticity may be measured using non-simultaneous velocity information under certain special conditions, namely, the following: The fluctuating velocities must consist primarily of (or be primarily manifested as) a periodic signal at a single, constant frequency. The signal must have a constant phase relationship to some other measured reference signal (such as pressure, acceleration or force) which is measured simultaneously with the velocity. Further, the phase relationship must be constant in time, but may vary with location. There must also be sufficient coherence between the velocity and the reference signal.

These special conditions may be found commonly in acoustics-related applications. When these conditions occur, vorticity may be inventively measured using non-simultaneous velocity measurements at several locations. In inventive testing as described hereinbelow, the inventive methodology was used to measure vorticity in a two-dimensional flow field. In the light of this disclosure, the ordinarily skilled artisan will understand that non-acoustic applications are also possible in accordance with the present invention. Since the inventive methodology typically applies when vorticity occurs strongly at one frequency, most inventive applications will be acoustics-related or vibrations-related.

Apparatus such as including the combination of an anemometer and a probe, for instance, can be used for sensing velocity. If the reference signal pertains to pressure, for example, a device such as a pressure sensor (or transducer) or microphone can be used for sensing the pressure. If the reference signal pertains to acceleration, a device such as an accelerometer can be used for sensing the acceleration. If the reference signal pertains to force, a device such as a dynamometer can be used for sensing the force. In applications involving vibrations (e.g., acoustics), velocity, acceleration, force and other properties can be measured as a way of measuring vibration. An important inventive criterion is that, regardless of the non-velocity property being inventively measured, the signal obtained should have good coherence with the fluid velocity. The ordinarily skilled artisan is well acquainted with these and other known apparatuses which can be utilized, in the context of inventive practice, for sensing various properties pertaining to fluid flow.

Figure 1:
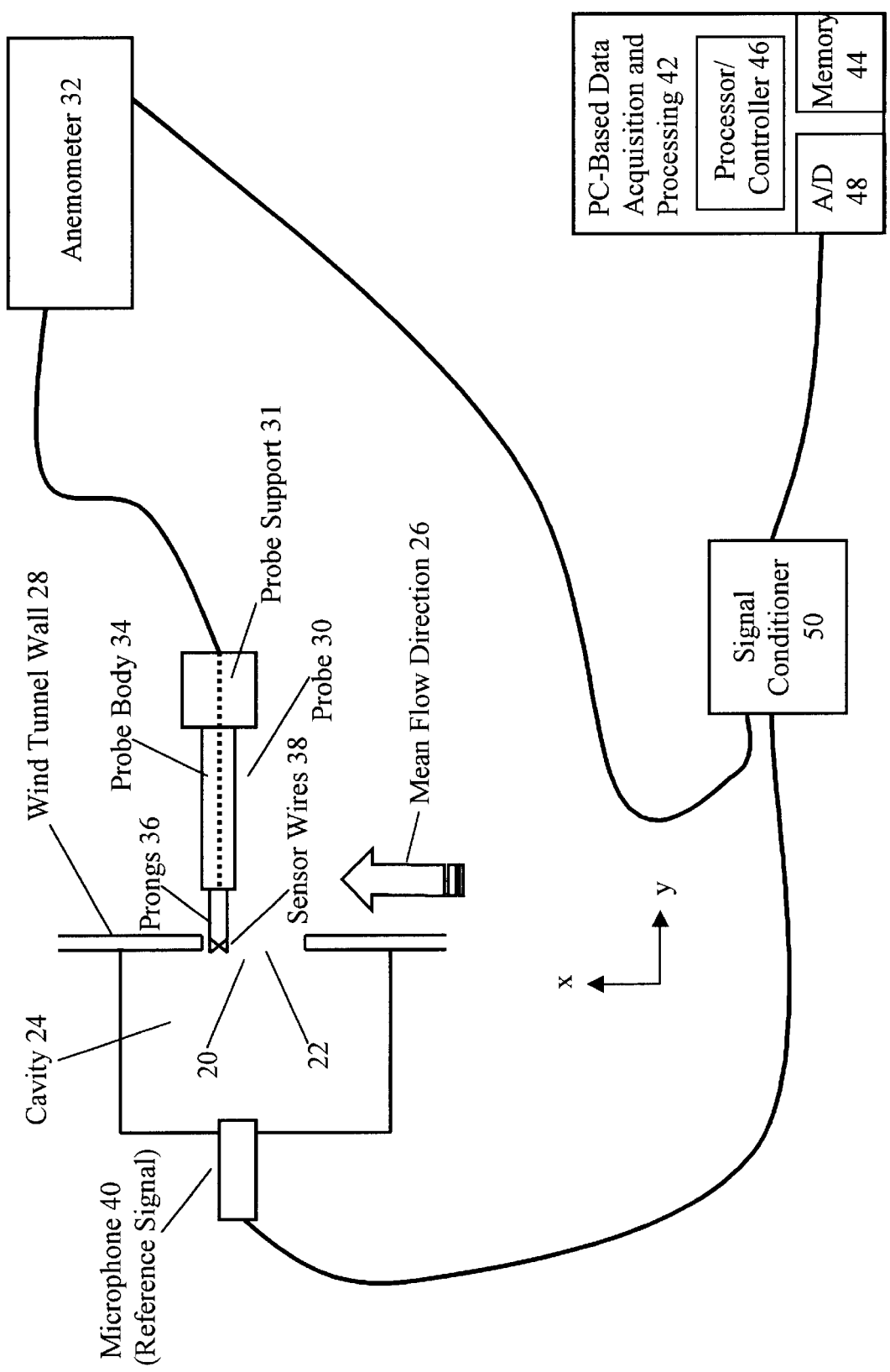
FIG. 1 is a schematic diagram showing the apparatus used for experimentation pertaining to the present invention.

Referring now to FIG. 1, the flow being measured is the shear layer 20 in the opening 22 of a flow-excited cavity 24. The reference signal is the fluctuating pressure in the cavity 22. It is known that these pressures are related to the velocity fluctuations in the shear layer 24 described by mean fluid flow direction 26 along wind tunnel wall 28. High (<0.5) coherence levels between the velocities and the cavity pressures were observed during inventive testing.

The velocities in the x and y directions, u and v, respectively, are measured using an x-wire probe 30 along with a constant temperature anemometer (CTA.) 32. X-wire probe 30 includes probe body 34, prongs 36 and sensor wires 38. Probe support 31 holds probe 30 in place. Prongs 36 project from probe body 34. Sensor wires 38 are attached to prongs 36 so as to form an "x" shape defining a plane oriented in cross-flow fashion, perpendicular to the primary fluid flow direction 26. X-wire probe 30 includes prongs 36 which support two sensor wires 38 such that the two wires are perpendicular to each other in the measurement plane of interest and are separated by a small distance in the out-of-plane direction.

Figure 3:
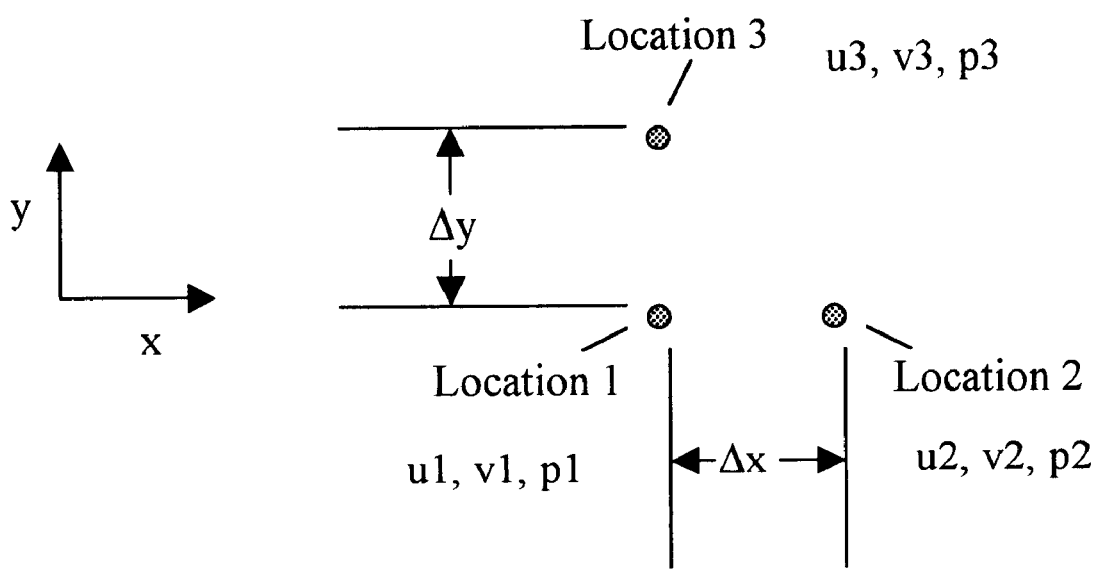
FIG. 3 is an exemplary diagrammatic depiction of the relationships among three locations which are the subject of vorticity determination using an inventive algorithm such as represented in FIG. 2A, FIG. 2B and FIG. 2C.

These measurements of velocity u and velocity v are made at a grid of x and y locations in the opening, wherein the z axis is not indicated in FIG. 1 and FIG. 3 but is understood to be perpendicular to the page. The velocity measurements at the various locations were done sequentially, not simultaneously. Measurements performed of the u and v at a given location were simultaneous. Cavity pressure was used as a reference signal p and, using microphone 40, was measured simultaneously with velocity.

Figure 2A:
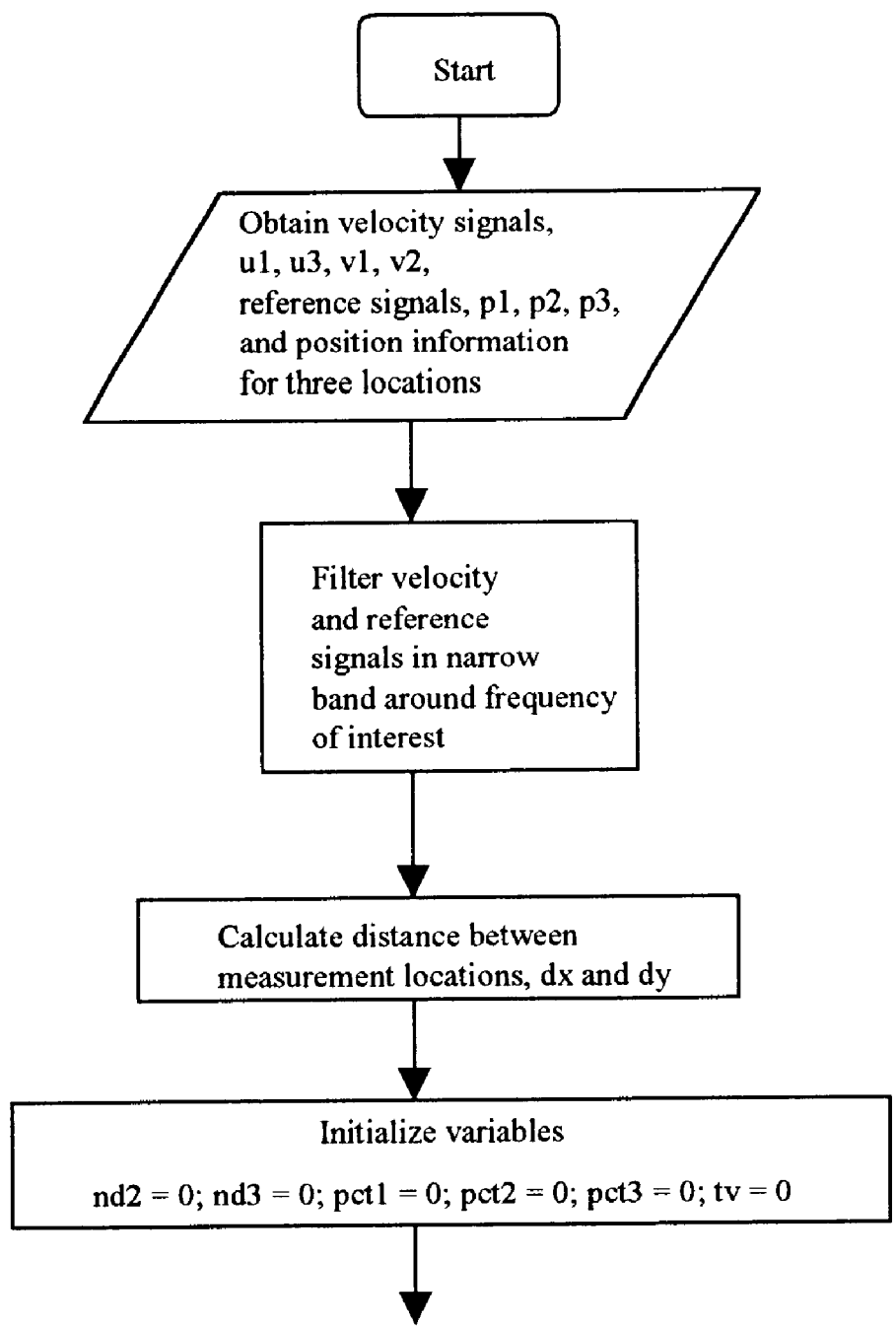
FIG. 2A, FIG. 2B and FIG. 2C together are a flow diagram illustrating an embodiment of an algorithm in accordance with the present invention.
Figure 2B:
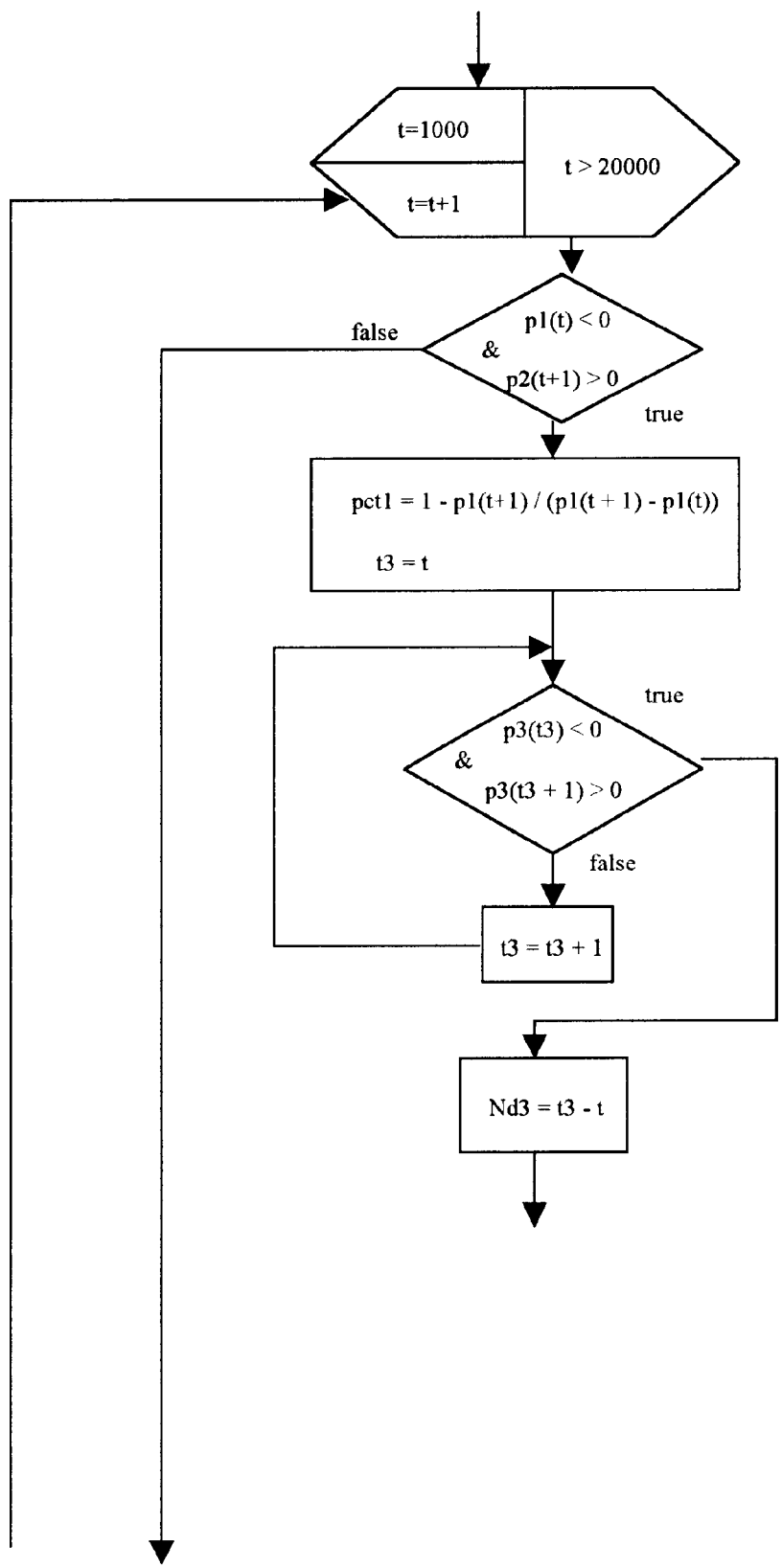
Figure 2C:
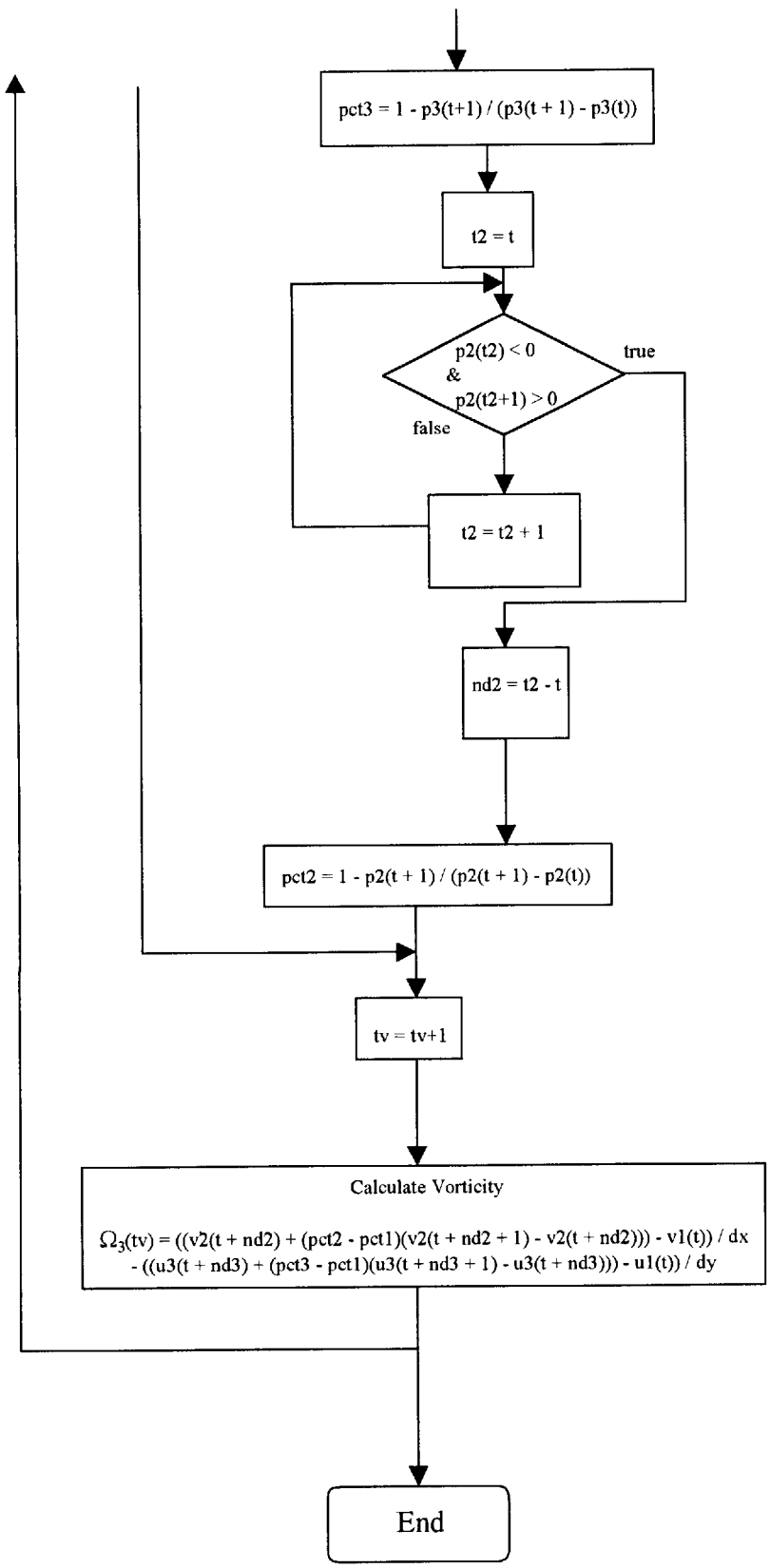

Still referring to FIG. 1 and also referring to FIG. 2 and FIG. 3, all data are recorded digitally on computer means such as a personal computer-based data acquisition and processing system 42, which includes memory 44, controller/processor 46 and analog-to-digital converter 48. Typically, an analog-to-digital converter includes a board in a computer which converts the incoming signals from analog (continuously varying voltage) to digital (a stream of numbers representing the numerical values of the voltage at discreet times, spaced evenly at a specified sampling frequency). FIG. 2 is a single flow chart comprising FIG. 2A, FIG. 2B and FIG. 2C. Vorticity at each location is determined using the inventive algorithm shown in FIG. 2A, FIG. 2B and FIG. 2C.

First, the velocity signals and the reference signals at each of three locations are retrieved from computer 42 storage (memory 44), along with the exact position of each location. FIG. 3 shows the relationship between the three locations. The symbols u1, v1 and p1 refer to the values of velocity u, velocity v and reference signal (pressure) p, respectively, measured at the first location (location 1). Likewise, the symbols u2, v2 and p2 designate u, v, and p, respectively, at the second location (location 2); the symbols u3, v3 and p3 designate u, v and p, respectively, at the third location (location 3).

Once obtained, the signals are conditioned (e.g., band pass filtered), via signal conditioner (e.g., band pass filter) 50, in a narrow frequency band centered around the frequency at which vorticity is being measured. The spacings between the locations, dx and dy, are also each calculated. Distances dx and dy are equivalently designated $\Delta x$ and $\Delta y$, respectively. The variables nd2 and nd3 represent the number of samples by which reference signals p2 and p3, respectively, are delayed from p1. The variables pct1, pct2 and pct3 each represent the corresponding fraction of the sampling period during which the positive zero-crossing of the reference signal occurs past the sample time for each location, and are each obtained by linear interpolation. The variable tv denotes the time variable for the vorticity. All of these variables are initialized to zero.

Then, for each time step starting and ending at times chosen based on the relationship between the sampling frequency and the measurement frequency, the time delays between reference signals at locations 2 and 1 and between reference signals at locations 3 and 1 are calculated. The sample period fraction for each of the reference locations are also calculated; however, if the sampling frequency is sufficiently greater than the measurement frequency, these may be considered negligible and hence omitted. When the appropriate delays are applied, the velocity signals are effectively simultaneous. Then, using these values, equation (3) may be inventively rewritten as $$\Omega_3=(v2-v1)/\Delta x-(u3-u1)/\Delta y. \quad (4)$$

The vorticity, $\Omega_3$, can be inventively calculated in the manner described hereinabove, including use of equation (4).

Variables nd2 and nd3 are at the heart of the present invention. Variable t represents the discrete time variable for the velocity and pressure (reference) data. Variables nd2 and nd3 represent the time delay (interval) between the reference signals. Since variables v2 and v1, for example, are not measured simultaneously with each other, the present invention prescribes that and how something be done to render them "effectively simultaneous." Since variables v2 and v1 were measured simultaneously with their reference signals, p2 and p1, and since in each case the velocity field has a constant phase relationship with the corresponding reference signal, the delay between the reference signals, nd2, can be determined and then applied to v2 to make it effectively simultaneous with v1. The same is done for u3 and u1.

The pct1, pct2 and pct3 variables refine the delay. Since the signal is digital, the ratio of the sampling frequency, Fs, to the frequency of interest, f, limits how accurately nd2 and nd3 can represent the delay. Therefore, pct1, pct2 and pct3 are calculated from the reference signals, p1, p2 and p3. They are the percentage (actually, the fraction) of one sampling period that the positive zero crossing of the reference signals (which is where the reference signals are compared to one another) is different from the actual sample time. Once obtained, the expression (pct2−pct1) is used to refine the term nd2, and the expression (pct3−pct1) is used to refine the term nd3.

It should be noted that the values for the delays are recalculated for each cycle of the measurement frequency. This prevents slight variation in frequency from invalidating the measurement. However, this also means that the values of vorticity calculated at times corresponding to the initial period of measurement are calculated using the initialized values of the delay and are thus no good. Therefore, according to typical inventive embodiments, the initial period's worth of the vorticity measurement must be discarded; that is, the initial time samples of the vorticity measurement corresponding to one period of the reference (or velocity) signal are rejected.

The following is an embodiment of computer source code in accordance with the present invention. The most pertinent portion of the program begins with the program's approximately seventieth written line (which reads "for i=1:N") and ends with the program's approximately one hundred forty-third written line (which reads "end").

```
%calculate vorticity and ept for 2d x-wire survey
sname = input ('input run series name for printing of processed data: ', 's');
nl = input('input number of locations: ');
fc = input('input center frequency of interest: ');
fw = input('width of frequency band: ');
locs = input('input measurement locations : ');
Fs = 4000; %sampling frequency
dT = 1/Fs;
Wn(1) = (fc−fw/2)/(Fs/2);
Wn(2) = (fc+fw/2)/(Fs/2);
[B,A] = butter(5,Wn);
x=locs (:,1)
y=locs (:,2)
%from measurement locations, determine locations for which vorticity
%may be calculated and tabluate triplets of velocity measurement
%locations for each vorticity measurement location
[xrs,roi]=sort(x); %reorder on x values
yrs=y(roi) ;
for i = 1:nl
    xngt(i) = 0;
    yngt(i) = 0;
    %find nearest-greater-than x index
    for j=1:nl
        if yrs(i) == yrs(j)
            if xngt(i) ~= 0
                if (xrs(j) < xrs(xngt(i))) & (xrs(j) > xrs(i))
                    xngt = j;
                end
            else
                if xrs(j) > xrs(i)
                    xngt(i) = j;
                end
            end
        end
    end
    %find nearest-greater-than y index
    if xrs(i) == xrs(j)
        if yngt(i) ~= 0
            if (yrs (j) < yrs (yngt (i))) & (yrs (j) > yrs (i))
                yngt (i) = j;
            end
        else
            if yrs (j) > yrs(i)
                yngt (i) = j;
            end
        end
    end
  end
end
%Convert back to original order
xng=zeros (nl, 1);
yng=zeros (nl, 1);
for i = 1:nl
    if xngt(i) ~= 0
        xng(i) = roi (xngt (i));
    end
    if yngt (i) ~= 0
        yng (i) = roi (yngt (i));
    end
end
[ind xnd ynd] = reord (roi, xng, yng);
vtrip = [ind xnd ynd];
```

-continued

```
%remove rows with zeros from vtrip
nv = 0;
for i = 1:nl
    if (vtrip (i,2) ~= 0) & (vtrip(i,3) ~= 0)
        nv=nv+1;
        vortrip(nv,1:3) = [vtrip (i,1) vtrip (i,2) vtrip (i,3)];
    end
end
[N, m] = size (vortrip);
for i = i:N
    %for triplet i, load relevant files and extract velocity and pressure
signals
    nc=3; %number of channels
    np=262144; %number of points per channel
    tnp=nc*np; %total number of points
    fname=['c:\diskd\data\' sname '.v' int2str (vortrip (i,1))];
    fid=fopen (fname, 'r');
    a=fread (fid, 2*tnp, 'float');
    fclose (fid);
    a1=a (1:2:2*tnp);
    u1=a1 (1:nc:tnp);
    v1=a1 (2:nc:tnp);
    p1=a1 (3:nc:tnp);
    fname=['c:\diskd\data\' sname ' .v' int2str (vortrip (i,2))];
    fid=fopen (fname, 'r');
    a=fread(fid,2*tnp, 'float');
    fclose (fid);
    a1=a (1:2:2*tnp);
    u1=a1 (1:nc:tnp);
    %u2=a1 (2:nc:tnp);
    v2=a1 (2:nc:tnp);
    fname=['c:\diskd\data\' sname '.v' int2str (vortrip (i,3) )];
    fid=fopen (fname, 'r');
    a=fread (fid, 2*tnp, 'float');
    fclose (fid);
    a1=a (1:2:2*tnp);
    u3=a1 (1:nc:tnp);
    %v3=a1 (2:nc:tnp);
    p3=a1 (3:nc:tnp);
    clear a a1
    um=mean(u1);
%filter velocity and pressure signals around desired frequency
    u1=filtfilt (B,A,u1)
    u3=filtfilt (B,A,u3);
    v1=filtfilt (B,A,v1);
    v2=filtfilt (B,A,v2);
    p1=filtfilt (B,A,p1);
    p2=filtfilt (B,A,p2);
    p3=filtfilt (B,A,p3);
    %point spacing for calculating vorticity
    dx=(x(vortrip (1,2)) − x(vortrip (i,1)))/39.4;
    dy=(y(vortrip (1,3)) − y(vortrip (i,1)))/39.4;
    [Ns,ms] = size (p1);
    nd2=0;nd3=0;pct1=0;pct2=0;pct3=0;itv=0; %initiaiize variables
% find delay between signals at different locations and calculate voriticity
    for it = 1000:17384
        if (p1(it) < 0) & (p1(it+1) >0)
            pct1 = 1 − p1(it+1)/(p1(it+1) − p1(it));
            it3=it;
            while ~((p3(it3) < 0) & (p3(it3+1) >0))
                it3=it3+1;
            end
            nd3=it3−it;
            pct3 = 1 − p3(it+nd3+1)/(p3(it+nd3+1) − p3(it+nd3));
            it2=it;
            while ~((p2(it2) < 0) & (p2(it2+1) >0))
                it2=it2+1;
            end
            nd2=it2−it;
            pct2 = 1 − p2(it+nd2+1)/(p2(it+nd2+1) − p2(it+nd2));
        end
        w1 = ((v2(it+nd2)+(pct2−pct1)*(v2(it+nd2+1)−v2(it+nd2)))−v1(it))/
dx;
        w2 = ((u3(it+nd3)+(pct3−pct1)*(u3(it+nd3+1)−u3(it+nd3)))−u1(it))/
dy; itv=itv+1;
        om3(itv) = w1−w2;
    end
    mom3(i,1)=mean(om3(20:itv));
    ept=(om3(21:itv) '−mom3(i,1)).*(v1(1020:17384)−mean
```

-continued

```
    (v1(1020:17384)));
    om3rms(i,1) = sqrt(mean(om3.*om3));
    eptmean (i,1) = −um*1.2*mean(ept);
    vol(i,1) = dx*dy;
    i
end
% locations of voriticity measurements
    xv(:,1) = x(vortrip(:,1));
    yv(:,1) = y(vortrip(:,1));
ou=[xv yv om3rms eptmean vol mom3];
eval (['save c:\diskd\mldata\' sname '_'int2str(fc) '_vor1 ou −ascii'])
%integrate energy production term
Wv = sum(eptmean. *vol);
%plot rms voriticity and ept
xg [0:.05:1];
yg [−.5:.02:.5];
[XI,YI]=meshgrid(xg,yg);
figure
subplot (2, 1, 1)
ZI=griddata (xv,yv,om3rms,XI,YI);
pcolor (XI, YI, ZI);
colorbar
title ('rms vorticity')
subplot (2,1,2)
ZI=griddata (xv,yv,eptmean,XI,YI);
pcolor (XI, YI, ZI)
colorbar
title (['mean energy production term − ' num2str (Wv) ' Watts'])
eval (['suptitle(''' num2str(fc) ' Hz'')'])
```

Hereinabove is disclosed a description how the present invention was actually implemented in the context of inventive testing. However, the present invention is not necessarily limited to two-dimensional flows (e.g., considered in terms of a two-dimensional Cartesian plane), typically wherein the velocity and the reference property (e.g., pressure, acceleration or force) will be measured at three locations, two of which locationally correspond to the x and y axes, respectively. Some inventive embodiments measure vorticity in relation to three-dimensional flows (e.g., considered in terms of a three-dimensional Cartesian space), typically wherein the velocity and the reference property (e.g., pressure, acceleration or force) will be measured at four locations, three of which locationally correspond to the x, y and z axes, respectively.

Equation (1) hereinabove is the well-known general equation for vorticity in three dimensions. The inventive principles will be practicable in either two or three dimensions, if the reader(s) of the instant disclosure can exercise ordinary skill regarding elementary fluid mechanics and procedural (e.g., algorithmic) computer program writing. In the light of this disclosure the ordinarily skilled artisan will be capable of practicing the present invention in association with either two-dimensional or three-dimensional flows and for any number of locations.

Nor does the present invention require that measurements u and v at a particular location be simultaneous, albeit that such simultaneity is exemplified hereinabove. Even at a given location, the sensing of x velocity component u and y velocity component v can take place nonsimultaneously. In the light of this disclosure, the ordinarily skilled artisan will be capable of practicing the invention regardless of simultaneity or nonsimultaneity of obtaining the velocity component signals at any particular location.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. A method for measuring vorticity relating to the flow of a fluid, said method comprising:

performing sensing at each of at least three locations in said fluid, said performing sensing including at least twice sensing a velocity component of said fluid and at least once sensing a reference property of said fluid, wherein at each said location are sensed at least two different velocity components which are in mutually orthogonal directions, and wherein each occurrence of said sensing of a said velocity component is contemporaneous with an occurrence of said sensing of said reference property; and calculating the vorticity of said fluid, said calculating including identifying a temporal relationship among all the occurrences of said sensing of said reference property at all said locations, said calculating further including rendering contemporaneousness of all the occurrences of said sensing of a said velocity component at all said locations, said rendering of contemporaneousness including considering said temporal relationship.

2. A method for measuring vorticity as recited in claim 1, wherein;

each said sensing of a said velocity component includes obtaining velocity information;

each said sensing of said reference property includes obtaining reference information;

said calculating of said vorticity further includes defining every said location; and said calculating of said vorticity is based on said defined locations, said velocity information, said reference information and said temporal relationship.

3. A method for measuring vorticity as recited in claim 1, wherein:

said performing sensing further includes establishing said at least three locations in said fluid;

said at least three locations lie in mutually orthogonal geometric axes; and said establishing includes identifying a positional relationship among said three locations.

4. A method for measuring vorticity as recited in claim 1, wherein at each said location each occurrence of said sensing of said reference property is noncontemporaneous with at least one occurrence of said sensing of said reference property at at least one other location.

5. A method for measuring vorticity as recited in claim 4, wherein at each said location each occurrence of said sensing of said reference property is noncontemporaneous with at least one occurrence of said sensing of said reference property at each of every other location.

6. A method for measuring vorticity as recited in claim 4, wherein at each said location the occurrences of said at least twice sensing a said velocity component are contemporaneous.

7. A method for measuring vorticity as recited in claim 1, wherein:

each said sensing of a said velocity component includes obtaining a velocity signal in a frequency range of interest;

each said sensing of said reference property includes obtaining a reference signal in said frequency range of interest; and at each said location each said velocity signal and a contemporaneous said reference signal are characterized by an approximately constant temporal phase relationship with respect to each other in said frequency range of interest.

8. A method for measuring vorticity as recited in claim 1, wherein;

each said sensing of a said velocity component includes obtaining a velocity signal;

each said sensing of said reference property includes obtaining a reference signal;

said method further comprises filtering said velocity signals and said reference signals into a selected frequency range.

9. A method for measuring vorticity as recited in claim 8, wherein at each said location each said velocity signal and a contemporaneous said reference signal are characterized by at least one of:

an at least substantially coherent relationship with respect to each other in said selected frequency range; and an approximately constant temporal phase relationship with respect to each other in said selected frequency range.

10. A method for measuring vorticity as recited in claim 8, wherein:

said identifying a temporal relationship includes determining at least two delays associated with said obtaining of said reference signals;

at said at least three locations said obtaining of said reference signals is effectuated sequentially from one said location to another said location; and said rendering contemporaneousness includes correlating said at least two delays with said obtaining of said velocity signals.

11. A method for measuring vorticity as recited in claim 1, wherein:

said at least three locations are four locations;

said four locations are a first location, a second location, a third location and a fourth location;

said four locations correspond to a three-dimensional Cartesian space;

said first location corresponds to a point which is not on the x-axis of said Cartesian plane, and which is not on the y-axis of said Cartesian plane, and which is not on the z-axis of said Cartesian plane;

said second location corresponds to a point on the x-axis of said Cartesian plane;

said third location corresponds to a point on the y-axis of said Cartesian plane;

said fourth location corresponds to a point on the z-axis of said Cartesian plane; and said vorticity is related to the three-dimensional flow of said fluid.

12. A method for measuring vorticity as recited in claim 1, wherein:

said at least three locations are three locations, said three locations are a first location, a second location and a third location;

said three locations correspond to a two-dimensional Cartesian plane;

said first location corresponds to a point which is not on the x-axis of said Cartesian plane and which is not on the y-axis of said Cartesian plane;

said second location corresponds to a point on the x-axis of said Cartesian plane;

said third location corresponds to a point on the y-axis of said Cartesian plane, and said vorticity is related to the two-dimensional flow of said fluid.

13. A method for measuring vorticity as recited in claim 12, wherein:

said calculating said vorticity includes using the equation $\Omega_3=(v2-v1)/\Delta x-(u3-u1)/\Delta y$;

$\Omega_3$ is the vorticity in the z direction;

u3 is the velocity component in the x direction at said third location;

u1 is the velocity component in the x direction at said first location;

v2 is the velocity component in the y direction at said second location; and v1 is the velocity component in the y direction at said first location.

14. A method for measuring vorticity as recited in claim 1, wherein said reference property is pressure.

15. A method for measuring vorticity as recited in claim 1, wherein said reference property is acceleration.

16. A method for measuring vorticity as recited in claim 1, wherein said reference property is force.

17. A method for measuring vorticity as recited in claim 1, wherein said reference property is selected from the group consisting of pressure, acceleration and force.

18. A computer program product comprising a computer useable medium having computer program logic recorded thereon for enabling a computer to determine the vorticity pertaining to the flow of a fluid, said computer program logic comprising:

means for enabling the computer to define at least three locations in said fluid;

means for enabling the computer to receive information pertaining to the sensing of the velocity of said fluid at said at least three locations, said sensing of the velocity of said fluid including the measurement of each of at least two velocity components of said fluid at each said location, said at least two velocity components being in mutually orthogonal directions at each said location;

means for enabling the computer to receive information pertaining to the sensing of a reference property of said fluid at said at least three locations, said sensing of the reference property of said fluid including at least one measurement of the reference property of said fluid at each said location, each measurement of a velocity component having been effected simultaneously with a measurement of the reference property;

means for enabling the computer to identify a time relationship among said it least three locations in terms of when said sensing of the reference property occurs, said identification of the time relationship including a distinction among said at least three locations as to when the at least one measurement of the reference property has been effected at each said location, and based on said identified time relationship, means for enabling the computer to represent simultaneity of said sensing of the velocity at said at least three locations, said simultaneity of said sensing of the velocity including a rendering of all measurements of a velocity component as having been effected simultaneously at said at least three locations, wherein said represented simultaneity of said sensing of the velocity permits said determination of the vorticity.

19. The computer program product according to claim 18, wherein said computer program product further comprises means for calculating said vorticity based on said represented simultaneity of said sensing of the velocity.

20. The computer program product according to claim 19, wherein:

said at least three locations lie in mutually orthogonal geometric axes;

said sensing of the velocity of said fluid is nonsimultaneously among said at least three locations; and said sensing of the reference property of said fluid is nonsimultaneous among said at least three locations.

21. The computer program product according to claim 19, wherein at each said location each measurement of a velocity component and the measurement of the reference property effected simultaneously therewith are characterized by an approximately constant time phase relationship in relation to each other.

22. The computer program product according to claim 19, wherein the reference property is selected from the group consisting of pressure, acceleration and force.

23. A system for determining the vorticity pertaining to the flow of a fluid, said system comprising:

a machine having a memory said machine containing a data representation of said vorticity pertaining to the flow of said fluid, said data representation being generated, for availability for containment by said machine, by the method comprising:

defining at least three locations in said fluid;

receiving information pertaining to the sensing of the velocity of said fluid at said at least three locations, said sensing of the velocity of said fluid including the measurement of each of at least two velocity components of said fluid at each said location, said at least two velocity components being in mutually orthogonal directions at each said location;

receiving information pertaining to the sensing of a reference property of said fluid at said at least three locations, said sensing of the reference property of said fluid including at least one measurement of the reference property of said fluid at each said location, each measurement of a velocity component having been effectuated simultaneously with a measurement of the reference property;

identifying a time relationship among said at least three locations in terms of when said sensing of the reference property occurs, said identifying of the time relationship including distinguishing among said at least three locations as to the times of effectuation of all measurements of the reference property at said at least three locations; and based on said identified time relationship, representing simultaneity of said sensing of the velocity at said at least three locations, said representing simultaneity of said sensing of the velocity including rendering all measurements of a velocity component as having been effectuated simultaneously at said at least three locations, wherein said represented simultaneity of said sensing of the velocity permits said determination of the vorticity.

24. The system according to claim 23, wherein said method further comprises calculating said vorticity based on said represented simultaneity of said sensing of the velocity.

25. The system according to claim 24, wherein:

said at least three locations lie in mutually orthogonal geometric axes;

said sensing of the velocity of said fluid is nonsimultaneous among said at least three locations; and said sensing of the reference property of said fluid is nonsimultaneous among said at least three locations.

26. The system according to claim 24, wherein at each said location each measurement of a said velocity component and the measurement of the reference property effected simultaneously therewith are characterized by an approximately constant time phase relationship in relation to each other.

27. The system according to claim 24, wherein the reference property is selected from the group consisting of pressure, acceleration and force.

28. The system according to claim 24, wherein said system further comprises:

means for measuring each said velocity component at each said location;

means for measuring said reference property at each said location; and for said machine having a memory, means for conditioning each measurement of a velocity component and each measurement of the reference component.

29. The system according to claim 28, wherein said means for measuring each said velocity component includes anemometer means and probe means.

30. The system according to claim 29, wherein said reference property is pressure, and wherein said means for measuring said pressure includes microphone means.

31. The system according to claim 28, wherein said rendering all measurements of a velocity component as having been effectuated simultaneously at said at least three locations includes evaluating the intervals pertaining to said effectuation of all measurements of the reference property at said at least three locations, and wherein said evaluating of said intervals includes:

designating interval variables;

designating refinement variables;

a based on measurements of the reference property, calculating values of said interval variables;

based on the measurements of the reference property, calculating values of said refinement variables; and refining said values of said interval variables, said refining including using said values of said refinement variables.

32. The system according to claim 31, wherein said means for conditioning includes means for selecting a frequency band for all measurements of a velocity component and all measurements of the reference property, and wherein said values of said interval variables are independently calculated for each cycle of said selected frequency band.

\* \* \* \* \*